United States Patent [19]

Leyser

[11] Patent Number: 4,719,623
[45] Date of Patent: Jan. 12, 1988

[54] METHOD OF RECEIVING TIME MULTIPLEXED SIGNALS TOGETHER WITH ENERGY REQUIREMENTS OF RECEIVER OVER A MULTIPLEX SIGNAL TRANSMISSION PATH

[75] Inventor: Klaus Leyser, Barienrode, Fed. Rep. of Germany

[73] Assignee: Blaupunkt-Werke Gmbh, Hildesheim, Fed. Rep. of Germany

[21] Appl. No.: 850,148

[22] Filed: Apr. 10, 1986

[30] Foreign Application Priority Data

Jun. 8, 1985 [DE] Fed. Rep. of Germany ....... 3520606

[51] Int. Cl.⁴ .............................................. H04J 3/06
[52] U.S. Cl. .................................... 370/100; 379/348; 370/119
[58] Field of Search ............... 370/100, 101, 105, 106, 370/49, 119; 375/113; 455/68; 379/348

[56] References Cited

U.S. PATENT DOCUMENTS

| | | | |
|---|---|---|---|
| 3,067,285 | 12/1962 | Turner | 375/113 |
| 3,390,232 | 6/1968 | Jager et al. | 375/113 |
| 3,654,492 | 4/1972 | Clark | 375/113 |
| 3,991,379 | 11/1976 | Chadwick et al. | 375/113 |
| 4,439,857 | 3/1984 | Rauth et al. | 370/100 |

FOREIGN PATENT DOCUMENTS 0156443 12/1980 Japan ................................... 375/113

Primary Examiner—Douglas W. Olms
Assistant Examiner—Wellington Chin
Attorney, Agent, or Firm—Frishauf, Holtz, Goodman & Woodward

[57] ABSTRACT

When a transmitter sends information signals time multiplexed in a single channel over a coaxial cable to a receiver, the expense necessary for synchronizing the demultiplexing operations to the multiplexing operations at the transmitter and for supplying the current necessary to energize the receiver is reduced by impressing or interposing pulses on or into the multiplex signal at the transmitter for synchronization and current supply at the receiver. 12 V pulses are transmitted at low impedance either as frame pulses at the beginning or at the end of a signal pulse frame of the multiplex signal or supplementarily as clock pulses between successive signal samples in the multiplex signal.

5 Claims, 6 Drawing Figures

METHOD OF RECEIVING TIME MULTIPLEXED SIGNALS TOGETHER WITH ENERGY REQUIREMENTS OF RECEIVER OVER A MULTIPLEX SIGNAL TRANSMISSION PATH

The invention concerns a method of simultaneously transmitting news and similar information arriving in parallel information channels to one or more receivers of a single transmission channel of a broad-band transmission medium such as a coaxial cable, by time multiplexing the signals provided by the parallel channels at the transmitting station.

In a known process of this kind, pulse generators are provided for synchronizing the transmitter and receiver by transmitting synchronizing pulses over a separate transmission path. Furthermore, if the receiver does not have its own independent current supply, a separate line is used to supply current to the receiver.

SUMMARY OF THE INVENTION

It is an object of the invention to provide a method of transmitting news information or the like that requires no supplementary line between transmitter and receiver in addition to the transmission channel necessary for the multiplex signal.

Briefly, pulses are impressed upon the multiplex signal serving for receiver synchronization and/or for current supply to the receiver. In the method of the invention, the voltage pulses impressed upon the multiplex signal are transmitted simultaneously with the multiplex signal over the transmission path that can for example be a simple coaxial cable. For power transmission purposes, these voltage pulses must have a low impedance path, which is readily available in a coaxial cable. At the receiver, the pulses impressed upon the multiplex signal are utilized for synchronizing the distribution of signals among output channels and for current supply of the receiver. No separate channel or conductor is necessary for synchronization or for a built-in current supply for the receivers.

The impressing of the voltage pulses on the information in the transmission channel can be performed either by putting voltage pulses regularly at the beginning or end of the individual pulse frames of the multiplex signal as so-called frame pulses or by inserting clock pulses between the signal samples of the individual channels, in addition to the frame pulses. By "pulse frame" is understood the time interval between two successive sampling of the same information channel. This time interval is equal to the reciprocal of the sampling frequency of the individual information channels.

The first alternative mentioned above has the advantage that the duration or duty cycle of the individual samples or sample values of the information to be transmitted can be made large, so that the transmission can take place with greater immunity to disturbance. A safety time spacing $\Delta t$ must be provided for maintaining a sufficiently low crosstalk threshold between the channels in the time interval between samplings of successively sampled channels, which interval advantageously should be made the reciprocal of $(n+1)$ times the sampling frequency (n is the number of parallel information channels sampled at the transmitter). The signal samples, in the case of pulse amplitude modulation (PAM) are amplitude modulated pulses, in the case of pulse phase modulation (PPM) are pulses modulated in phase by the amplitude of the sampled signal and in the case of pulse code modulation (PCM) are code words representing the amplitude of the sampled signal in the original individual information channel at the transmitter, which is assumed to be an ordinary audio frequency voice transmission channel.

The second above-mentioned alternative way of performing the method of the invention is distinguished by the large proportion of the time duration of each element of the multiplex signal in which an additional voltage pulse is impressed, as the result of which the power transmission is comparatively large. Furthermore, it is very simple to provide synchronization of the receiver by clock pulses following every signal sample or sample value. The clock pulses are advantageously inserted in the above-mentioned safety time spacing interval $\Delta t$ between successive samples or sample values, which safety margin can be correspondingly enlarged to accomodate a very short clock pulse.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 3:
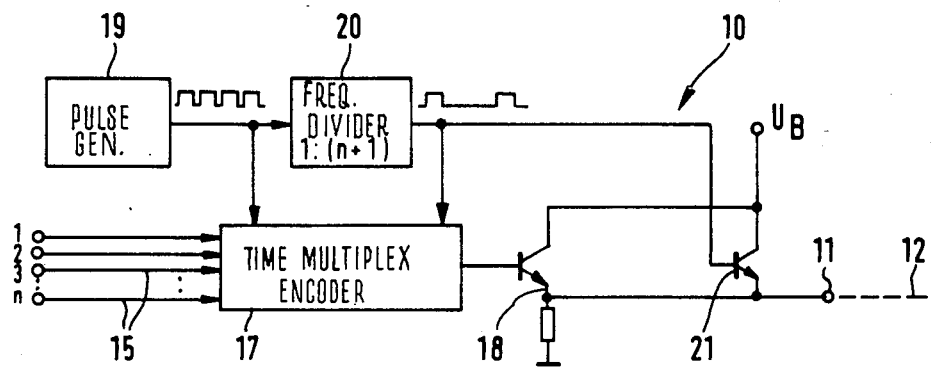
FIG. 3 is a block circuit diagram of a transmitter for generating the multiplex signal of FIG. 1.

FIG. 3 shows a transmitter 10 for transmitting over a transmission path 12, for example a coaxial cable, from the transmitter output 11 to the input 13 (FIG. 4) of a receiver 14. At the transmitter 10, n parallel information channels are supplied as inputs in each of which the information appears as time function signals. In the receiver 14 shown in FIG. 4, the same number of n parallel information channels 16 is provided as a group of outputs in each of which the information of the corresponding input channel 15 of the transmitter 10 is reproduced at the transmission over the path 12.

The transmitter 10 has a time multiplex encoder 17 which successively interrogates the n information channels 15 in prescribed time intervals. The time multiplex encoder 17 is controlled by a pulse generator 19 and switches over with each pulse therefrom to the next information channel 15. The information or signals appearing in the channels 15 are sampled, after band-limiting and amplification, in the time multiplex encoder 17 at a sampling frequency $f_S$, which is greater than twice the highest frequency to be found in the information channels 15. The individual samples or sample values of the channels 15 each sampled in turn are supplied successively to the transmission path 12 through an impedance matching output stage 18 constituted as an emitter-follower, so that at this point a composite multiplex signal made up of the samples is transmitted. The time intervals in which the information channels 15 are sampled one after the other corresponds to the reciprocal of $(n+1)$ times the sampling frequency $f_S$, where n again is the number of the information channels 15. The pulse frequency of the pulse generator 19 accordingly is $(n+1) \cdot f_S$.

Figure 1:
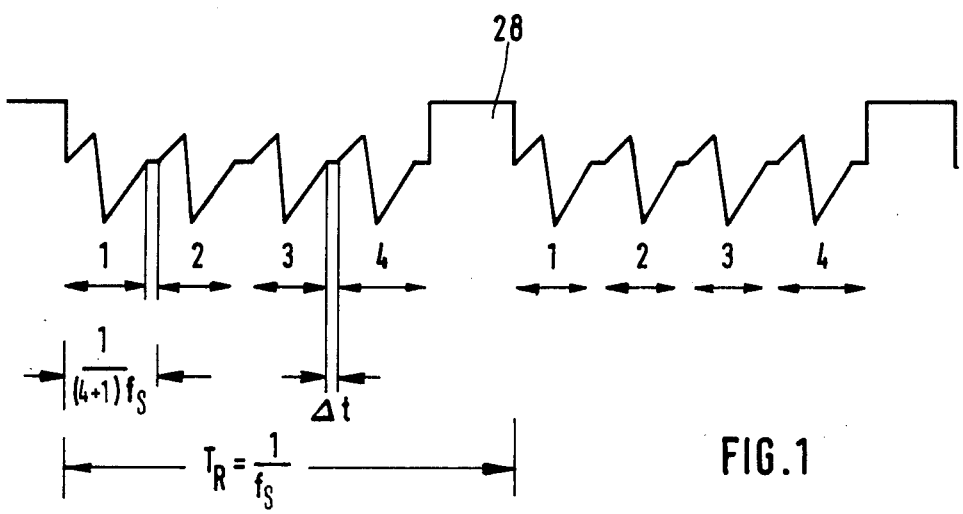
FIG. 1 is a wave-shape diagram of a multiplex signal with frame pulses impressed thereon.

The resulting multiplex signal is illustrated in FIG. 1 as a function of time. For simplification of this representation of the multiplex signal, equal amplitudes for the individual signal samples are assumed. In order to maintain a particular crosstalk threshold, a safety spacing $\Delta t$ is maintained between the samples of successive information channels 15. The time interval between the individual samples, including the safety spacing $\Delta t$, is the reciprocal of $(n+1) \cdot f_S$. The time interval between two sample values from the same information channel 15 corresponds to the reciprocal of the sampling frequency $f_S$ and is designated as the pulse frame $T_F$ of the multiplex signal. In the example of FIG. 1, a multiplex signal is shown which is produced by sampling four information channels 15. The amplitude samples taken from the information in the various channels are designated in FIG. 1 by the corresponding channel numbers.

As can be seen in FIG. 1, a frame pulse 28 is provided at the beginning or the end of a pulse frame interval $T_F$, which is to say in every first or every $(n+1)$th interval. The frame pulse 28 is formed from a very low impedance 12 V pulse having the pulse duration of one interval, therefore an interval which has a duration of the reciprocal of $(n+1) \cdot f_F$. For the purpose of providing the frame pulse, a frequency divider 20 in the transmitter 10 is provided for counting down the output of the pulse generator 19, the frequency division ratio being $1:(n+1)$. At the output of the frequency divider 20, there appears a sequence of control pulses of the frequency $f_S$ and a keying ratio of $1/(n+1)$. By keying ratio is meant the duty cycle, which is the ratio of the pulse duration to the pulse period.

The control pulses at the output of the frequency divider 20 are supplied, on the one hand, to the time multiplex encoder 17 and, on the other hand, to the base of a transistor 21 which has its collector connected to operating voltage $U_B$ of 12 volts and its emitter connected to the output 11 of the transmitter 10. The control pulses produce an interruption of the channel switching in the time multiplex encoder 17 for a time interval of $1/(n+1) \cdot f_S$ and also, for the same interval, switching the operating voltage $U_B$ of 12 volts onto the output 11 of the transmitter 10. As a result, a 12 V frame pulse 28 is impressed upon the multiplex signal for the duration of a time interval of $1/(n+1) \cdot f_S$, and this is done at a constant frequency of $f_S$.

Figure 4:
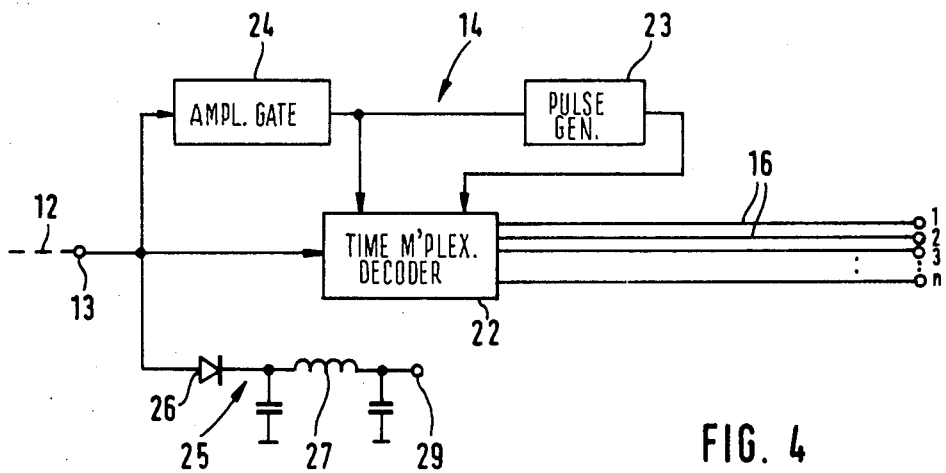
FIG. 4 is a block circuit diagram of a receiver for processing the multiplex signal of FIG. 1.

As shown in FIG. 4, the receiver 14 has a time multiplex decoder 22 which is controlled by a pulse generator 23 at the pulse frequency $(n+1) \cdot f_S$. The time multiplex decoder 22 successively connects the channels 15 with the receiver input 13 in step with this control. The synchronization of the pulse generator 23 is produced by the frame pulses 28 sorted out of the multiplex signal by an amplitude gate 24 from the input 13. These pulses serve at the same time to block the time multiplex decoder 22 for the duration of each pulse, so that after n switching operations of the input 13 of the receiver 14 to one after another of the n information channels 16, the appearance of the frame pulse 28 for its duration prevents any of the information channels 16 from receiving any response from the receiver.

In addition to the multiplex decoder 22 and the high-amplitude gate or threshold stage 24, there is also a current supply stage 25 connected to the input 13 of the receiver 14. The current supply stage 25 contains a rectifier 26 and a low-pass filter 27. It derives a direct current supply voltage for operating the receiver 14 by rectifying the frame pulses 28 of the multiplex signal and provides the operating voltage at its output 29.

Figure 5:
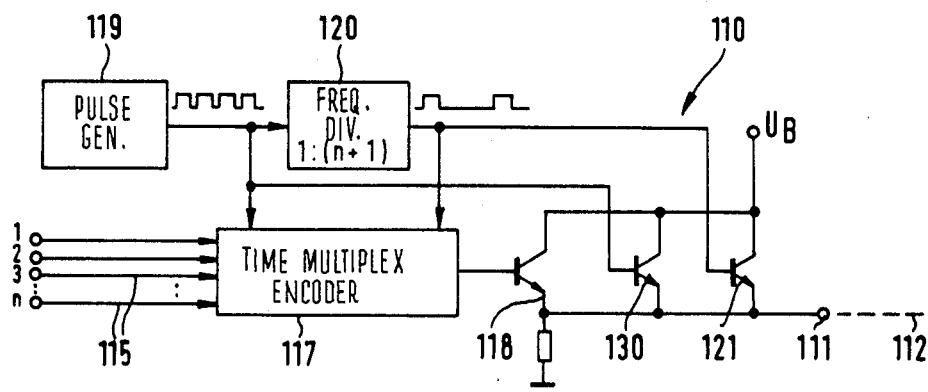
FIG. 5 is a block circuit diagram of a transmitter for generating the multiplex signal of FIG. 2.

The transmitter 110 shown in block diagram in FIG. 5 as a further illustrative example of the practice of the method of the invention is, except for a transistor 130, identical with the transmitter 10 of FIG. 3, for which reason corresponding components are designated with reference numerals raised in each case by 100. The transistor 130 is connected in parallel with the transistor 121 and has its collector connected to the operating voltage $U_B$ and has its emitter connected to the output 111 of the transmitter 110. The pace of the transistor 130 is connected to the output of the pulse generator 119.

By sampling the n parallel information channels 115, a multiplex signal is produced on which are impressed or interposed frame pulses 128 of frequency $f_S$ by means of the transistor 121 and clock pulses 131 of frequency $(n+1) \cdot f_S$ by means of the transistor 130. The multiplex signal transmitted to the receiver 114 over the transmission path 112 is schematically shown as a function of time in FIG. 2. The number of channels at the transmitter input and receiver output is again assumed to be four. The samples taken from the individual channels are again designated by the channel number. A clock pulse 131 is inserted between successive signal samples, so that in each time interval lasting $1/(n+1) \cdot f_S$ there is contained one amplitude sample and one clock pulse 131. The ratio of the duration of each combination of signal sample and clock pulse is determined by the keying ratio of the pulse generator 119. The clock pulses 131 also supplementarily take over the function of the safety spacing $\Delta t$ provided in the case of the multiplex signal of FIG. 1, so that such an additional gap does not have to be provided in the signal of FIG. 2. As in the case of the multiplex signal of FIG. 1, at the beginning or at the end of each pulse frame $T_F$ of the multiplex signal a frame pulse 128 is inserted.

Figure 6:
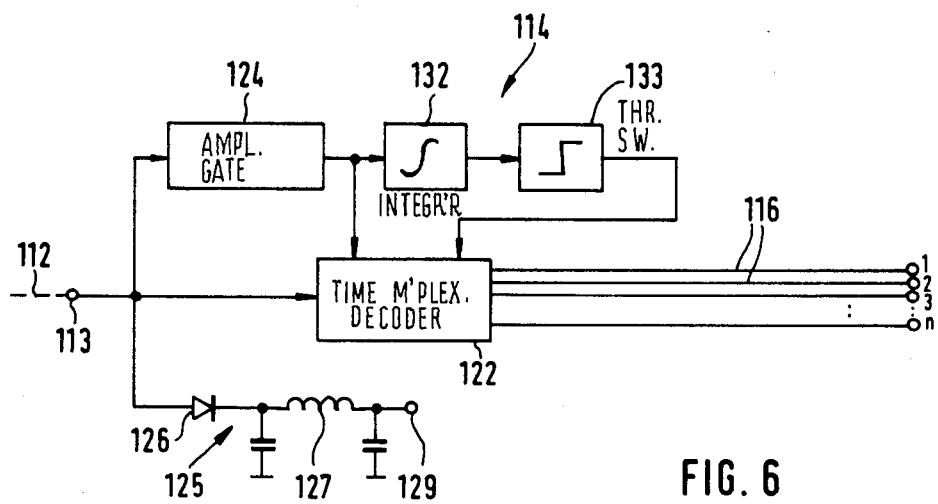
FIG. 6 is a block circuit diagram of a receiver for processing the multiplex signal of FIG. 2.

The receiver 114 shown in FIG. 6 connected to the transmission line 112 is to a great extent identical with the receiver 14 shown in FIG. 4, so that corresponding components are designated by corresponding reference numerals raised by 100. The time synchronous control of the time multiplex decoder 112 is accomplished directly by the clock pulses 131 which are filtered out by the amplitude gate 124 from the multiplex signal and supplied to the time multiplex decoder 122. The input 113 of the receiver 114 is switched to the individual information channels 116 in succession at the frequency of the above-mentioned clock pulses 131, so as to distribute the individual sample signals synchronously to the corresponding information channels 116.

An integrator 132 is connected to the output of the amplitude gate 124 which is connected to the time multiplex decoder 122. The output of the integrator 132 is connected through a threshold switch 133 to the time multiplex decoder 122. The clock pulses 131 and the frame pulse 128 occurring within a pulse frame $T_f$ are integrated together in the integrator 132 in such a way that when the frame pulse 128 appears, the switching threshold of the threshold switch 133 is exceeded. The output pulse of the threshold stage 133 blocks the switching of an output channel 116 through the time multiplex decoder 122 to the input 113 of the receiver 114 for the duration of a time interval $1/(n+1) \cdot f_S$, which corresponds to the duration of a frame pulse 128, so that none of the information channels 116 are connected with the input 113 for the duration of the presence of a frame pulse 128.

Figure 2:
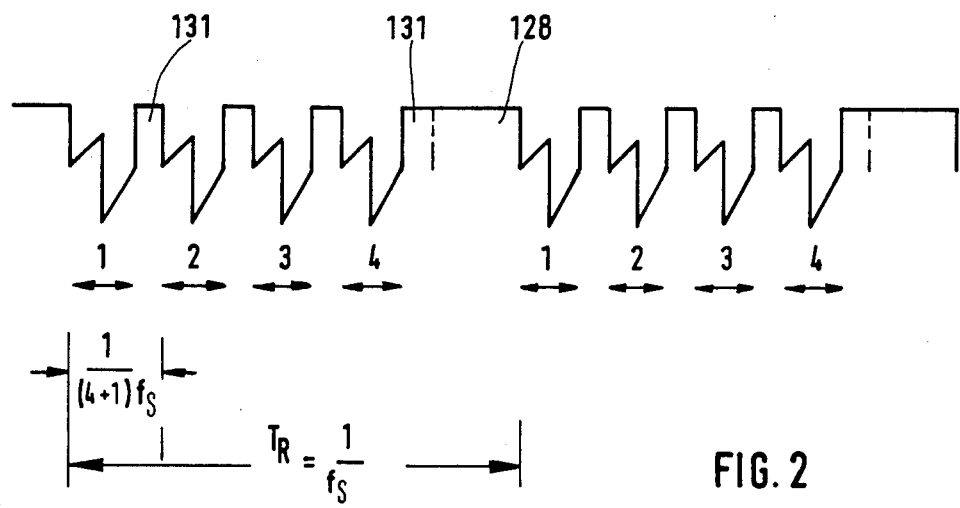
FIG. 2 is a wave shape diagram of a multiplex signal with frame and clock pulses impressed thereon.

The current supply stage 125 derives a d-c supply voltage in the same way from the transmitted frame pulses 128 and clock pulses 131. Because of the greater aggregate time duration of the 12 V pulse transmitted at low impedance, which represents the clock pulse 131 and the frame pulse 128, substantially greater energy is made available for the current supply of the receiver 114. As can be seen in FIG. 2, the pulse duration of the frame pulse 128 is many times greater than the duration of the clock pulses 131.

Although the invention has been described with reference to particular illustrative examples, it will be recognized that variations and modifications are possible within the inventive concept.

I claim:

1. Method of receiving, in a receiver, time multiplexed signal transmissions, together with receiver electric power requirements, over a transmission path from a transmitter without requiring said transmission path to pass frequencies outside the bandwidth of said time multiplex transmissions or to pass direct current to said receiver, said transmissions including signals multiplex into channel time slots of equal duration and including framing pulses distinguishable from other signals of said time multiplex transmissions by their greater amplitude and energy content and each occupying an interval not exceeding the duration of a time slot, including the steps of:

rectifying said time multiplexed signal transmissions as received at an input of said receiver, by charging an input filter capacitor through a diode and gradually discharging said input filter capacitor through a filter impedance (27, 127) to charge an output filter capacitor, whereby during normal reception of said transmissions said diode passes rectifier current only when a pulse of the amplitude of said frame pulses is present;

passing said time multiplex signal transmissions from said receiver input through an amplitude gate (24, 124) and thereby detecting at least said framing pulses;

demultiplexing said signals as received at said receiver input in a time multiplex decoder (22, 122) controlled as to framing by said detected framing pulses and having auxiliary equipment (23, 132, 133) for timing time-slot switching in said demultiplexer under control of the output of said amplitude gate 8;

blocking said time multiplex decoder during the presence of each said detected framing pulse, and supplying electric energy requirements of said amplitude gate, said time demultiplexing and said auxiliary equipment thereto in the form of direct current obtained from the common connection (29, 129) of said filter impedance and said filter output capacitance.

2. Method according to claim 1, wherein said auxiliary equipment comprises a pulse generator (23), by which time slot switching pulses are supplied to said time multiplex decoder under contol of said detected framing pulses for synchronization.

3. Method according to claim 1, wherein said multiplex transmissions also include clock pulses for time-slot switching, and wherein said amplitude gate (124) serves to detect said clock pulses as well as said framing pulses and said auxiliary equipment includes integrator and threshold switch means for separating detected framing pulses from said clock pulses and serving to supply framing pulses to a control input of said time multiplex decoder which is different from the input to which said clock pulses are provided from said amplitude gate for time slot switching.

4. Method according to claim 2, wherein said framing pulses have a duration equal to a said time slot.

5. Method according to claim 3, wherein said framing pulses have a duration equal to a said time slot.

* * * * *